(12) United States Patent
Ling et al.

(10) Patent No.: US 7,332,849 B2
(45) Date of Patent: Feb. 19, 2008

(54) METHOD AND TRANSDUCERS FOR DYNAMIC TESTING OF STRUCTURES AND MATERIALS

(75) Inventors: Shih Fu Ling, Singapore (SG); Xiaoyan Hou, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 11/437,028

(22) Filed: May 19, 2006

(65) Prior Publication Data
US 2007/0267944 A1 Nov. 22, 2007

(51) Int. Cl.
*H01L 41/08* (2006.01)
(52) U.S. Cl. .................. 310/331; 310/328; 310/330; 310/336; 310/348; 73/584
(58) Field of Classification Search ............. 310/328, 310/330–332, 336, 348; 73/504.12, 576, 73/579, 584, 589, 488, 604.12
See application file for complete search history.

(56) References Cited

U.S. PATENT DOCUMENTS

| | | | | |
|---|---|---|---|---|
| 2,861,256 | A | * | 11/1958 | Hart .......................... 367/135 |
| 5,284,058 | A | * | 2/1994 | Jones ......................... 73/579 |
| 6,035,716 | A | * | 3/2000 | Beekman et al. ............. 73/579 |
| 6,732,591 | B2 | * | 5/2004 | Miles et al. .................. 73/808 |
| 2005/0120797 | A1 | * | 6/2005 | Butts ........................... 73/668 |
| 2006/0210100 | A1 | * | 9/2006 | Kim et al. .................... 381/171 |

OTHER PUBLICATIONS

Hou, Xiaoyan, et al. "A New Transducer for Detecting Point Impedance of Structures to Moment." Twelfth International Congress on Sound and Vibration (ICSV 12), Jul. 11-14, 2005, Lisbon.

* cited by examiner

*Primary Examiner*—Thomas M. Dougherty
(74) *Attorney, Agent, or Firm*—Blakely, Sokoloff, Taylor & Zafman; Stephen M. De Klerk

(57) ABSTRACT

A transducer for dynamic testing of specimen is disclosed. The transducer comprises at least two equally-spaced actuators, and a supporting block for supporting the at least two equally-spaced actuators and for mounting the transducer to the specimen. Each of the at least two equally-spaced actuators is an electrically powerable for providing to the specimen: a force or a moment. The actuators may be bimorphs and the transducer may be able to operate as an actuator, a sensor, and simultaneously as an actuator and a sensor. This may be for the transducer being able to operate as a sensor, for measurement of at least one selected from the group consisting of: an excitation force exerted on the specimen, an excitation moment exerts on the specimen, a resultant translational velocity of the specimen at an excitation point, and a rotational velocity of the specimen at the excitation point. The at least two equally-spaced actuators are able to produce a force on the specimen when electricity supplied to the at least two equally-spaced actuators is in phase, and a moment on the specimen when the electricity supplied to the at least two equally-spaced actuators is out of phase.

20 Claims, 15 Drawing Sheets

(a)

(b)

(a)

(b)

(a)

(b)

(c)

METHOD AND TRANSDUCERS FOR DYNAMIC TESTING OF STRUCTURES AND MATERIALS

FIELD OF THE INVENTION

This invention relates a method and transducers for dynamic testing of structures and materials and more particularly, through not exclusively, to a method and transducers for translational or rotational dynamic testing by one or more of: generating pure force or moment, detecting point translational or rotational impedance of structures, measuring force or moment, sensing linear or rotational velocity, and characterizing materials with dynamic behavior.

BACKGROUND OF THE INVENTION

Mechanical impedance of a structure or material, in general, is defined as the quotient of the excitation force or moment, and the caused velocity response along the same axis of excitation. If the excitation and motion are at the same point, it is a point impedance. If not, it is transfer impedance. If displacement or acceleration is used instead of velocity, the quotient is the dynamic stiffness, or inertiance, respectively. These quotients are often termed as Frequency Response Functions ("FRF"s) as they are complex functions expressed in spectra of modulus and phase. FRF's describe the inherent dynamic characteristics of the test structure or material and do not change with external excitation. They therefore are commonly utilized to characterize the dynamic behavior of a structure or material.

The motion at a point of an object in space is fully described by six degrees of freedom: three translational and three rotational. Point translational impedances are the ratio of the force applied to the structure to the linear velocity along the force direction, measured at the same point. Point rotational impedances are the ratio of the moment applied to the structure to the angular velocity along the moment direction, measured at the same point. These ratios are normally acquired in modal analysis and material characterization, and are widely utilized to facilitate modern structural and mechanical design, sound and vibration control, and so forth.

When measuring the translational impedance at a single point along a direction, the most commonly used technique is to excite the test structure using a shaker; and to measure the excitation force and the output motion by a conventional load cell and an accelerometer, respectively. This means that three devices are involved: a shaker, a force sensor, and a motion sensor. Amplifiers are often required for each of these devices. The loading effects, calibration errors, and misalignments introduced by the three devices alone or together often affect the accuracy of measurement. In addition, if on-site installation of exciters and sensors on structures is necessary, ensuring true measurement at the driving point and along the same axis could be a major error-source that would need to be eliminated through time-consuming procedures. In cases where the object under testing is small in size, these problems are amplified, and more difficult to overcome.

Compared to translational impedance, measuring rotational impedance is more difficult, and more inaccurate. Due to the lack of proper transducers for creating moments, and measuring rotational motion, only translational impedances are able to be identified in conventional dynamic testing. After tests are completed, all rotational motions are interpolated from the translational motions at two or more adjacent points. In numerical simulations, both translational and rotational impedances are able to be utilized to quantify the characteristics of a dynamic system.

Many studies have attempted to improve the technology of detecting rotational impedance, or other rotational FRFs. To test for rotational impedance, three transducers were required: a pure moment exciter, a moment sensor to detect the applied moment, and a motion sensor to measure the resultant angular motion. All three transducers do not exist and the tests are normally done indirectly using linear force and motion transducers.

FIG. 1 shows a prior art apparatus. A pair of identical shakers 10 is operated in opposing phases to provide moment excitation to the test structure through a lever 12. Two identical load cells 14 are placed on the lever 12 to measure the excitation forces from the shakers 10 and consequently to deduce the moment exerted to the structure 11. The resultant rotational motions are then measured by a pair of identical accelerometers attached onto the structure surface close the receiver point 15 of the test structure. This two-shaker approach possesses severe problems leading to large measurement errors. The principal problem is the dependence of the measurement on the cross mobility at the receiver points 15. In a structure, most points, except the symmetric center, have non-zero cross mobility which simply means a force or moment excitation along a direction also generates translational and rotational motions in other directions. When the connection point of the whole apparatus to the structure is not the symmetric centre, the cross mobility of the structure would cause errors as the exerted moment may generate linear forces or a moment along other axes which do not contribute to rotational velocity under measurement. These errors due to cross mobility are too severe to be neglected as the impedances are defined as the quotient of excitation and caused response along the same axis. Eliminating the errors is by use of additional complex correction items which can only be quantified through further FRF measurements.

The two-shaker approach is further troubled by its very limited frequency range of excitation. This limit is caused by the vibration of the lever 12 connecting the shakers 10 to the test structure 11. To validate the basic assumption of the approach that the lever 12 is rigid, the method can only be employed in a frequency range far below the first natural frequency of the lever 12.

The third problem is not less significant: the pair of load cells 14 and the pair of linear accelerometers 13 must be very similar, if not identical. Tiny differences in specifications or performance could cause major errors as the measurements are based on the differences between the outputs of the two sensors. Lastly, the size and complexity of the apparatus make its use and installation inconvenient and difficult.

SUMMARY OF THE INVENTION

In accordance with a first preferred aspect there is provided a transducer for dynamic testing of a specimen. The transducer comprises at least two equally-spaced bimorphs and a supporting block for supporting the at least two equally-spaced bimorphs and for mounting the transducer to the specimen. Each of the at least two equally-spaced bimorphs is an electrically powerable actuator for providing to the specimen one of: a force, and a moment.

The at least two equally-spaced actuator may be identical and may be selected from: a bimorph, a piezoelectric-based electromechanical actuator, a stake actuator containing a stake of piezoceramic disks of the same diameter, a force exciter, and an electro-magnetic shaker.

In accordance with a second preferred aspect there is provided a transducer for dynamic testing of a specimen. The transducer comprises at least two equally-spaced bimorphs and a supporting block for supporting the at least two equally-spaced bimorphs and for mounting the transducer to the specimen. The transducer is able to operate as a sensor for measurement of at least one of: an excitation force exerted on the specimen, an excitation moment exerted on the specimen, a resultant translational velocity of the specimen at an excitation point, and a rotational velocity of the specimen at the excitation point.

In accordance with a third preferred aspect there is provided a transducer for dynamic testing of a specimen. The transducer comprises at least two equally-spaced bimorphs and a supporting block for supporting the at least two equally-spaced bimorphs and for mounting the transducer to the specimen. The transducer is able to operate as at least one of: an actuator, a sensor, and simultaneously as an actuator and a sensor.

For the third aspect, the sensor may be for measurement of translational and rotational mechanical impedance of the specimen where the transducer is mounted to the specimen.

For the first and second aspects, the transducer may be able to operate as at least one of: an actuator, a sensor, and simultaneously as an actuator and a sensor; and when operating as a sensor is for translational and rotational dynamic measurement.

For the first and third aspects, the transducer may be for operating as a sensor for measurement of at least one of: an excitation force exerted on the specimen, an excitation moment exerted on the specimen, a resultant translational velocity of the specimen at an excitation point, and a rotational velocity of the specimen at the excitation point.

According to a fourth preferred aspect there is provided a method for dynamic testing of specimen. The method comprises electrically powering at least two equally-spaced actuators of a transducer to cause motion of the at least two equally-spaced actuators. The at least two equally-spaced actuators are mounted on a supporting block, the supporting block being mounted to the specimen. The at least two equally-spaced actuators provide to the supporting block at least one of: a force, and a moment.

According to a fifth preferred aspect there is provided a method for dynamic testing of a specimen. The method comprises electrically powering at least two equally-spaced bimorphs of a transducer to cause motion of the at least two equally-spaced bimorphs. The at least two equally-spaced bimorphs are mounted on a supporting block, the supporting block being mounted to the specimen. The transducer operates as a sensor for measuring at least one of: an excitation force exerted on the specimen, an excitation moment exerts on the specimen, a resultant translational velocity of the specimen at an excitation point, and a rotational velocity of the specimen at the excitation point.

According to a sixth preferred aspect there is provided a method for dynamic testing of a specimen. The method comprises electrically powering at least two equally-spaced bimorphs of a transducer to cause motion of the at least two equally-spaced bimorphs. The at least two equally-spaced bimorphs are mounted on a supporting block, the supporting block being mounted to the specimen. The transducer operates as at least one of: an actuator, a sensor, and simultaneously as an actuator and a sensor.

For the fourth and fifth aspects, the transducer may operate as at least one of: an actuator, a sensor, and simultaneously as an actuator and a sensor. When operating as a sensor it may be for translational and rotational measurement.

For all aspects, the at least two equally-spaced bimorphs may produce a force on the specimen when an electricity supply to the at least two equally-spaced bimorphs is in phase, and a moment on the specimen when the electricity supply to the at least two equally-spaced bimorphs is out of phase.

For all aspects, the at least two equally-spaced bimorphs may be substantially identical. They may be in an array in a plane perpendicular to a central, longitudinal axis of the supporting block. The array may have the central, longitudinal axis as its centre. Each of the at least two equally-spaced bimorphs may have an inner end that is spaced from the central, longitudinal axis, and may also be spaced from the inner end of each other bimorph. The array may comprise a plurality of diagonally-opposite pairs of bimorphs. Each of the at least two equally-spaced bimorphs may be a piezoelectric bimorph. Each bimorph may comprise an upper piezoelectric element, a lower piezoelectric element, and a reinforcing shim between the upper and lower piezoelectric elements. The supporting block may comprise an insulator on which the at least two equally-spaced bimorphs are mounted. The insulator may be an electrical insulator, and may be solid. The at least two equally-spaced bimorphs may be securely and rigidly attached to the supporting block. The at least two equally-spaced bimorphs may be arranged in diagonally opposite pairs of two bimorphs. The upper piezoelectric element of a first of the two bimorphs may be electrically connected to the lower piezoelectric element of a second of the two bimorphs for sensing rotary velocity. Alternatively or additionally, the upper piezoelectric element of the first of the two bimorphs may be electrically connected to the upper piezoelectric element of the second of the two bimorphs; and the lower piezoelectric element of the first of the two bimorphs may be electrically connected to the lower piezoelectric element of the second of the two bimorphs; for sensing linear velocity. Electricity for supply to the at least two equally-spaced bimorphs may be of the same amplitude to each of the at least two equally-spaced bimorphs.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

In the drawings.

DETAILED DESCRIPTION OF THE PREFERRED EMBODIMENTS

Figure 1:
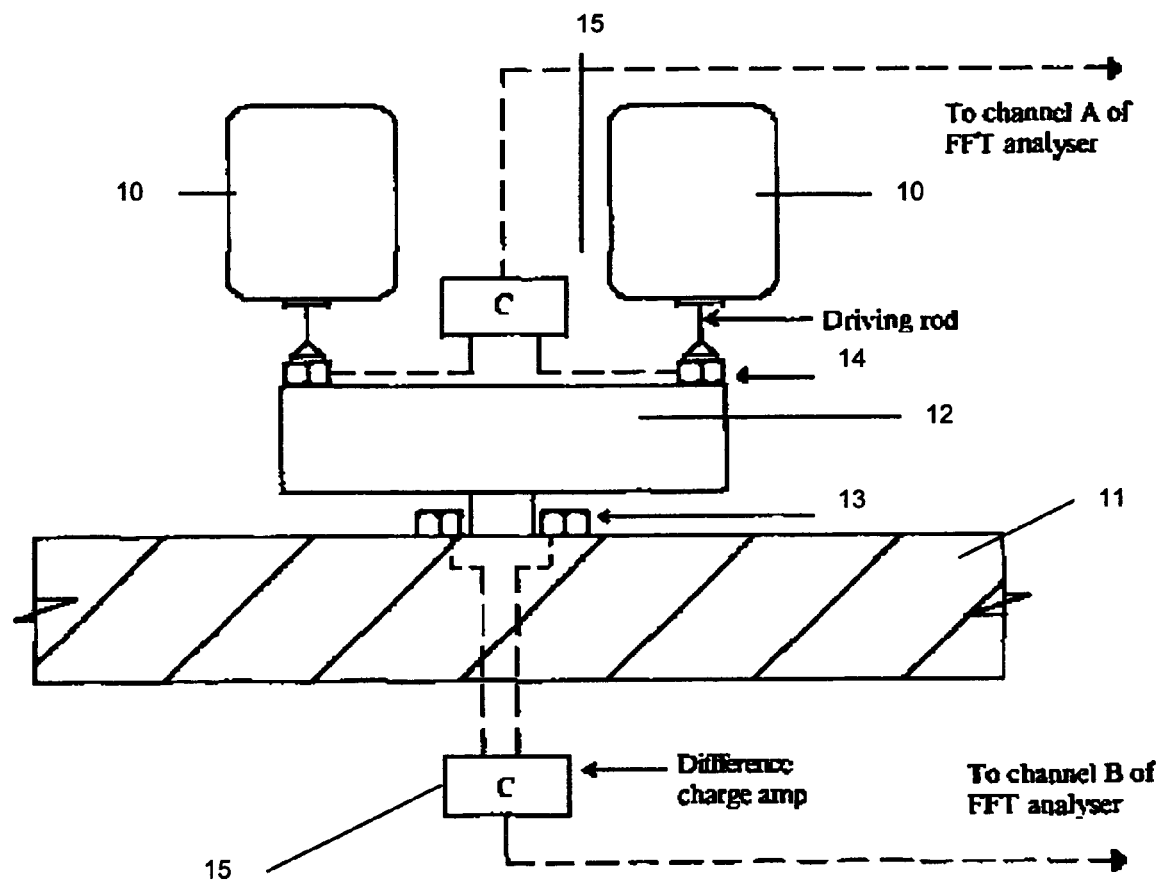
FIG. 1 is a schematic front view of a prior art apparatus.
Figure 2:
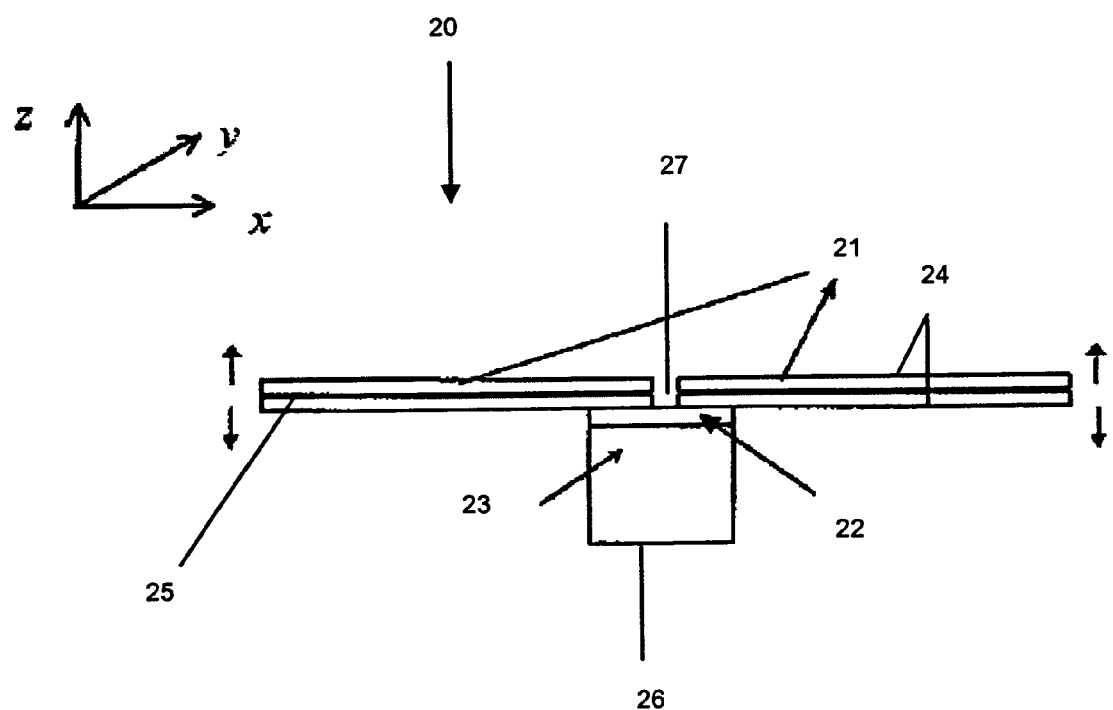
FIG. 2 is a schematic front view of a first preferred embodiment.

The schematic illustration of FIG. 2 shows transducer 20 comprising a pair of identical or substantially identical piezoceramic (PZT) bimorphs 21, an insulating layer 22, and a supporting block 23. The two bimorphs 21 have the same or substantially the same material characteristics and substantially the same dimensions, and are each attached to the insulating layer 22 at their inner ends. The insulating layer 22 electrically insulates the bimorphs 21, as does the gap 27 between their inner ends. It is preferred for the insulating layer 22 to be solid so as to not interfere with the transmission of forces and motion to block 23 and thus the specimen.

Each bimorph 21 consists of two piezoelectric elements 24, which are electrically connected in series and have opposite polarization directions. The bimorphs 21 are securely and rigidly attached to the supporting block 23 at their inner ends. A center metal shim 25 is inserted between the two piezoelectric layers 22 to improve the strength of the bimorph 21. The metal shim 25 may be, for example, steel or aluminum. The transducer 20 is able to function as an actuator and as a sensor simultaneously in either translational or rotational measurement.

When utilized in dynamic testing, the bottom surface 26 of the supporting block 23 is attached to the structural or material specimen surface at the location where point mechanical impedance is to be measured. During testing, ac electrical power is supplied to each of the bimorphs 21 which, due to the extension and contraction of piezoceramic layers 24, will vibrate up and down as a cantilever and generate a harmonic force and moment acting at the cantilever root—the supporting block 23.

Figure 3:
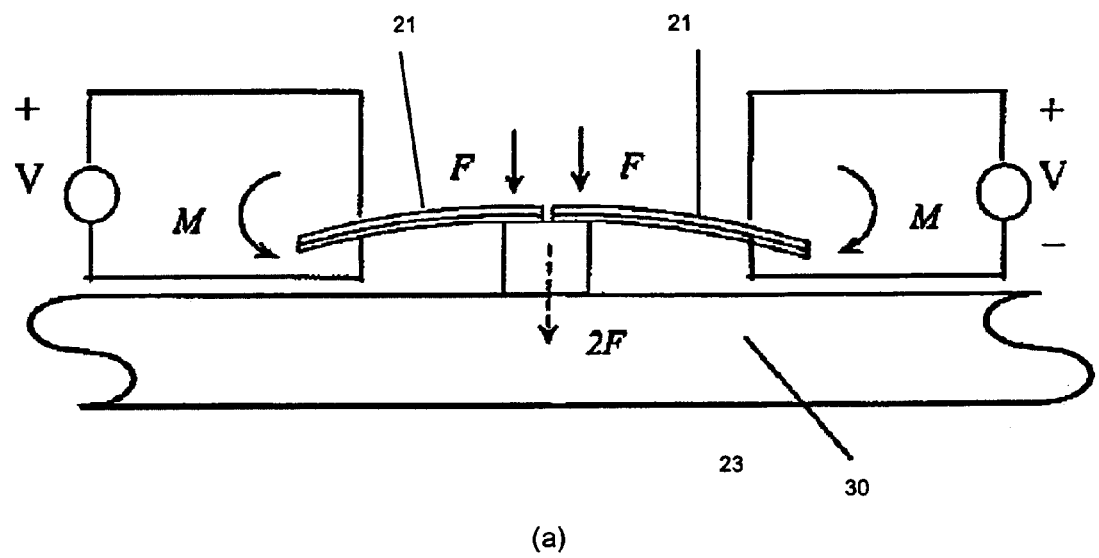
FIG. 3 is a schematic illustration of two operational modes of the embodiment of FIG. 2.
Figure 3:
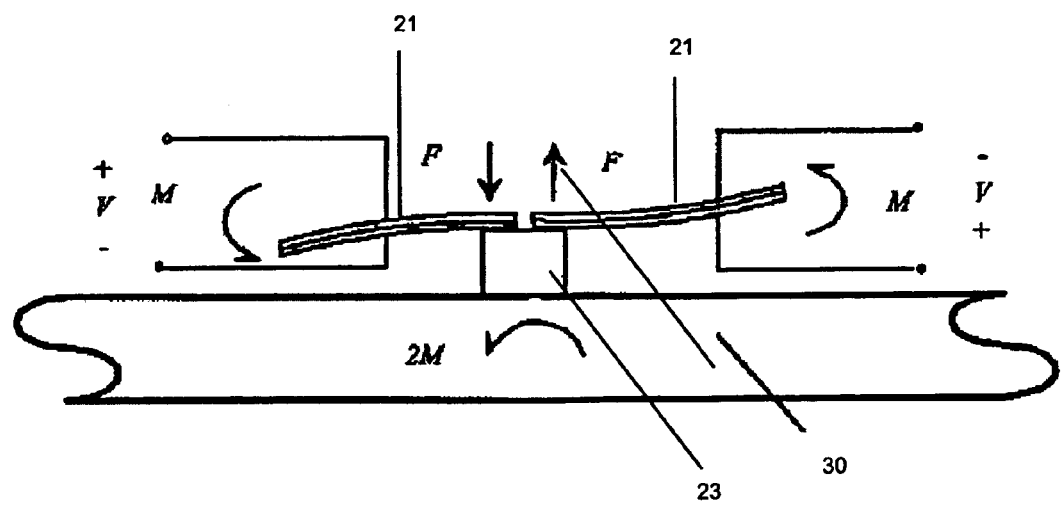

As shown in FIG. 3(a), if the electrical signals V applied to the two bimorphs 21 are identical in both amplitude and phase, the two generated moments M are of the same magnitude but opposite phase, and therefore offset each other. At the same time, the two generated forces F are of same magnitude and therefore result in an oscillating force 2F of double the magnitude of the force F acting vertically on to the supporting block 23 and thus the test object 30.

If the electricity V supplied to the two bimorphs is of the same amplitude but is 180° out of phase as shown in FIG. 3(b), the two forces F offset each other. However, the two moments M are added together and assert an oscillating moment 2M on the supporting block 23, and thus the test object 30.

As such, the bimorphs 21 are able to produce an excitation force to the block 23 when the electricity supply is in phase, and an excitation moment when the electricity supply is 180° out of phase.

Figure 4:
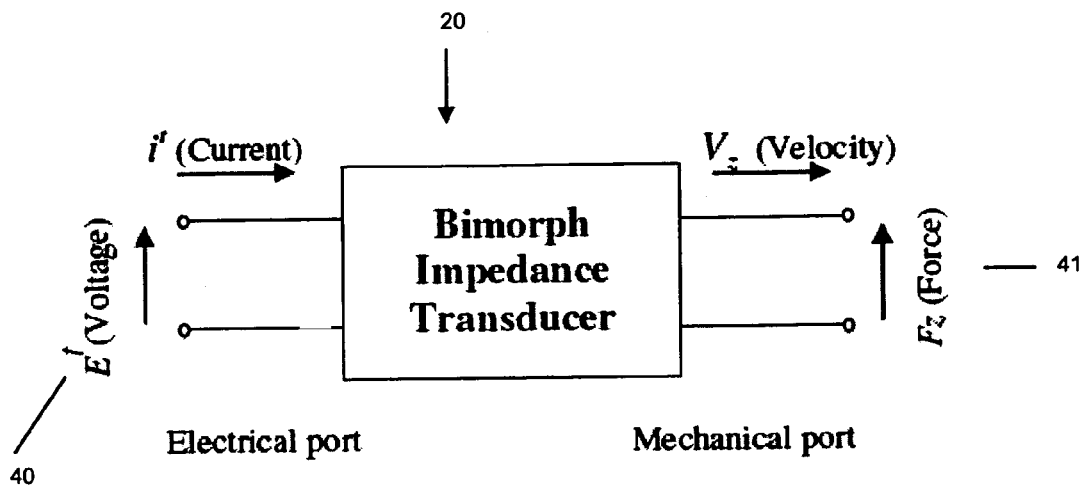
FIG. 4 is a four-pole model of the embodiment of FIG. 3(b) in (a) translational and (b) rotational modes.
Figure 4:
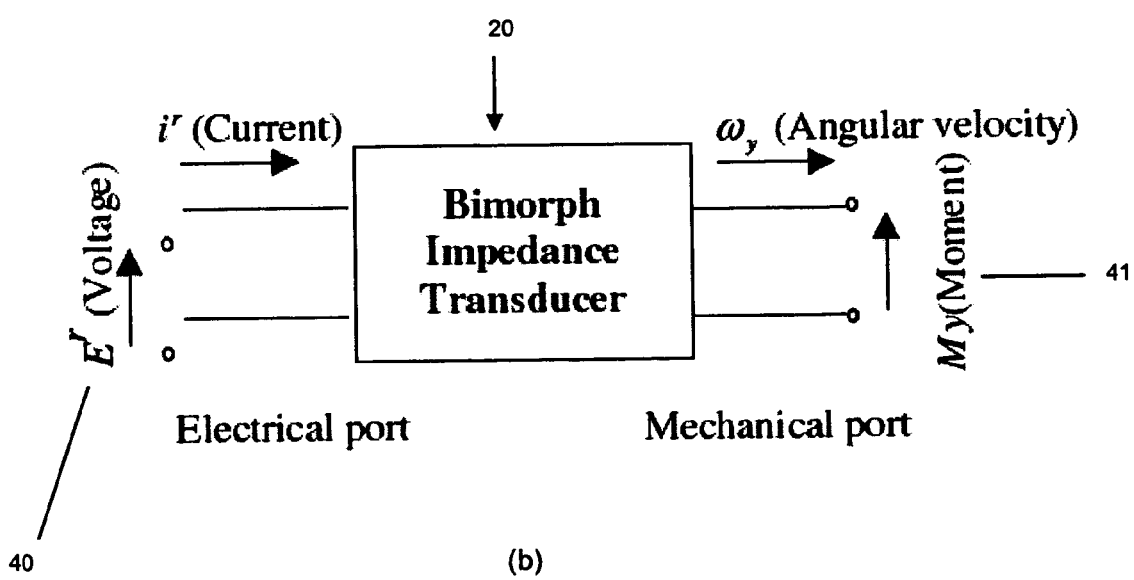

In FIG. 4, the transducer 20 is viewed as a dynamic system with the electrical supply point 40 as the input port and the bottom surface 26 of the supporting block as the output port 41, respectively. During actuating, owing to the piezoelectric effect, variations of the mechanical potential (either force or moment) and flow (either linear or rotational velocity) experienced at the output port 41 will change the potential and flow variables at the input port 40. The voltage and current probed at the input port 40 are the combination of the supplied electricity, and the electricity created by the piezoelectric effect.

The electro-mechanical interaction taking place in the transducer 20 can be properly described by a four-pole model. The relationships between the mechanical and electrical variables are given by:

For translational case:

$$\begin{bmatrix} E^t \\ i^t \end{bmatrix} = \begin{bmatrix} a_{11} & a_{12} \\ a_{21} & a_{22} \end{bmatrix} \cdot \begin{bmatrix} F_z \\ v_z \end{bmatrix} = [a] \cdot \begin{bmatrix} F_z \\ v_z \end{bmatrix} \quad (1)$$

For rotational case:

$$\begin{bmatrix} E^r \\ i^r \end{bmatrix} = \begin{bmatrix} b_{11} & b_{12} \\ b_{21} & b_{22} \end{bmatrix} \cdot \begin{bmatrix} M_y \\ \omega_y \end{bmatrix} = [b] \cdot \begin{bmatrix} M_y \\ \omega_y \end{bmatrix} \quad (2)$$

Where $E^t$=electrical voltage applied to the left and right bimorphs;

$E^r$=electrical voltage supplied to the left bimorph, which is 180° out-of-phase with the voltage supplied to the right bimorph;

$i^t$=sum of the electrical current on the left and right bimorphs;

$i^r$=difference of the current on the left and right bimorphs;

$F_z$=output force along z direction;

$v_z$=output velocity along z direction;

$M_y$=output moment about y axis.

$\omega_y$=output angular velocity about y axis.

The coordinate system (x, y, z) used is shown in FIG. 2, and the superscripts t and r denote the translation and rotation cases respectively.

Matrix [a] and [b] are the translational transduction matrix and rotational transduction matrix, respectively. They fully describe the dynamic characteristics of the transducer 20. The four elements in the matrices are transduction functions. Each of them is normally frequency spectra describing the relationships between one input electrical variable and one output mechanical variable. From Equations (1) and (2), these transduction functions can be identified as For translational case: (3)

$$a_{11} = E^t/F_z \mid_{vz=0} \quad a_{21} = i^t/F_z \mid_{vz=0}$$
$$a_{12} = E^t/v_z \mid_{Fz=0} \quad a_{22} = i^t/v_z \mid_{Fz=0}$$

For rotational case: (4)

$$b_{11} = E^r/M_y \mid_{\omega y=0} \quad b_{21} = i^r/M_y \mid_{\omega y=0}$$
$$b_{12} = E^r/\omega_y \mid_{My=0} \quad b_{22} = i^r/\omega_y \mid_{My=0}$$

The translational/rotational impedance of the tested structure at the output port 41 of the transducer 20:

$$Z_z^t = \frac{F_z}{v_z} \quad (5)$$

$$Z_y^r = \frac{M_y}{\omega_y} \quad (6)$$

The input electrical impedance of the transducer 20 for translational/rotational case is:

$$Z_e^t = \frac{E^t}{i^t} \quad (7)$$

$$Z_e^r = \frac{E^r}{i^r} \quad (8)$$

Combining Equations (1) to (8) gives:

$$Z_z^t = -\frac{a_{22}Z_e^t - a_{12}}{a_{21}Z_e^t - a_{11}} \quad (9)$$

$$Z_y^r = -\frac{b_{22}Z_e^r - b_{12}}{b_{21}Z_e^r - b_{11}} \quad (10)$$

Equations (9) and (10) show that, after transduction functions are made available, translational/rotational impedance at the measurement point (which is also the output port 41 of the transducer 20) can be evaluated from the corresponding input electrical impedance $Z_e^t/Z_e^r$, which is much easier to obtain accurately by probing and processing the input voltage and current at the input port 40.

This is based on the assumptions that the transducer 20 is linear, reciprocal, and is without internal energy consumption or generation. These assumptions are properly satisfied, in general, considering the construction. Damping in the components may cause an increase in power consumption which, however, is minimal, and thus negligible from a practical viewpoint.

The transducer 20 may be used with mechanical or structural systems of different sizes and of different scales—micro, mini, meso, or macro. By changing the size and weight of the bimorphs 21 and the supporting block 23, the generated forces F moments M and the working frequency range can varied to suit test objects 30 of different sizes and scales.

Fabrication processes commonly available in micro system technology (MST), or micro electromechanical systems (MEMS), ultra-precision engineering, or conventional manufacturing engineering enables production of the transducers 20 in micro-, mini-, and macro-scale with a suitable precision. Implementing the mathematical operations in Equations (9) or (10) may be firmware based on DSP (digital signal processing) or a microprocessor. The microprocessor or DSP may be integral with the transducer 20, or may be separate.

The configuration of the transducer 20 may be altered to suit more complicated excitation and measurement needs in dynamic testing. One example is that the single degree translational or rotational excitation described above may be extended to two or even three degrees of freedom by introducing a further pair of bimorphs 21 perpendicular to the first bimorphs 21. If more bimorphs 21 are added it should be in a manner that creates the cancellation of the movements M when out of phase, and cancellation of the forces F when in phase. Therefore, they are in an array equally spaced (on an angle basis) around a plane perpendicular to the central longitudinal axis of the block 23; and the array of the bimorphs 21 has that longitudinal axis as its centre. All such bimorphs 21 should be at least substantially identical.

The bimorphs 21 may also be changed to other actuators such as, for example, other smart materials (e.g. magnetostrictive materials) or mechanisms which convert electrical power to mechanical power, and vice versa. This may be desired where power requirements are different. Furthermore, varying the voltage applied to the bimorphs 21 allows further or finer adjustment of the forces and moments generated by the transducer 20 which, in turn, could provide improved sensitivity of the transducer 20 when used for dynamic measurements.

The transducer 20 may be used for dynamic testing such as, for example, health condition monitoring of:
mechanical and civil structures;
stationary or mobile machinery;
operational condition monitoring of manufacturing processes;
quality assessment and evaluation of products or works;
material characterization of special natural and man-made materials;
and so forth.

Dynamic testing is widely used to identify FRFs of a structure or machinery. The dynamic characteristics revealed by FRFs allow design improvement, condition monitoring and property or quality evaluation.

Figure 5:
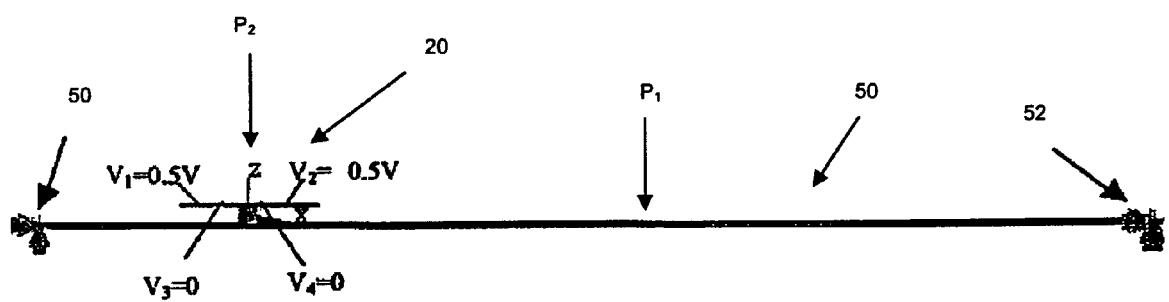
FIG. 5 is an illustration of the preferred embodiment of FIG. 2 in an in-use situation testing a beam.

For example, and as shown in FIG. 5, an aluminum beam 50 of 1060 mm length, 12.7 mm width, and 4.7 mm thickness was clamped at both ends 51, 52. Point translational impedance at two points was measured using the transducer 20: the middle point $P_1$ and the point $P_2$ at 200 mm from the left clamped end 51. The transducer 20 was affixed to the beam 50 by double-sided adhesive tape with the bimorphs 21 pointing along the beam 50. In addition to testing, a numerical simulation was done for comparison purpose. Both the transducer 20 and beam 50 were modeled by finite elements using an ANSYS package. Supplied with in-phase sinusoidal voltages with an amplitude of 0.5 Volts, the transducer 20 caused vibration of the beam 50. By having voltages in phase, the force F was applied to the beams 50, but no moment M was applied.

Figure 6:
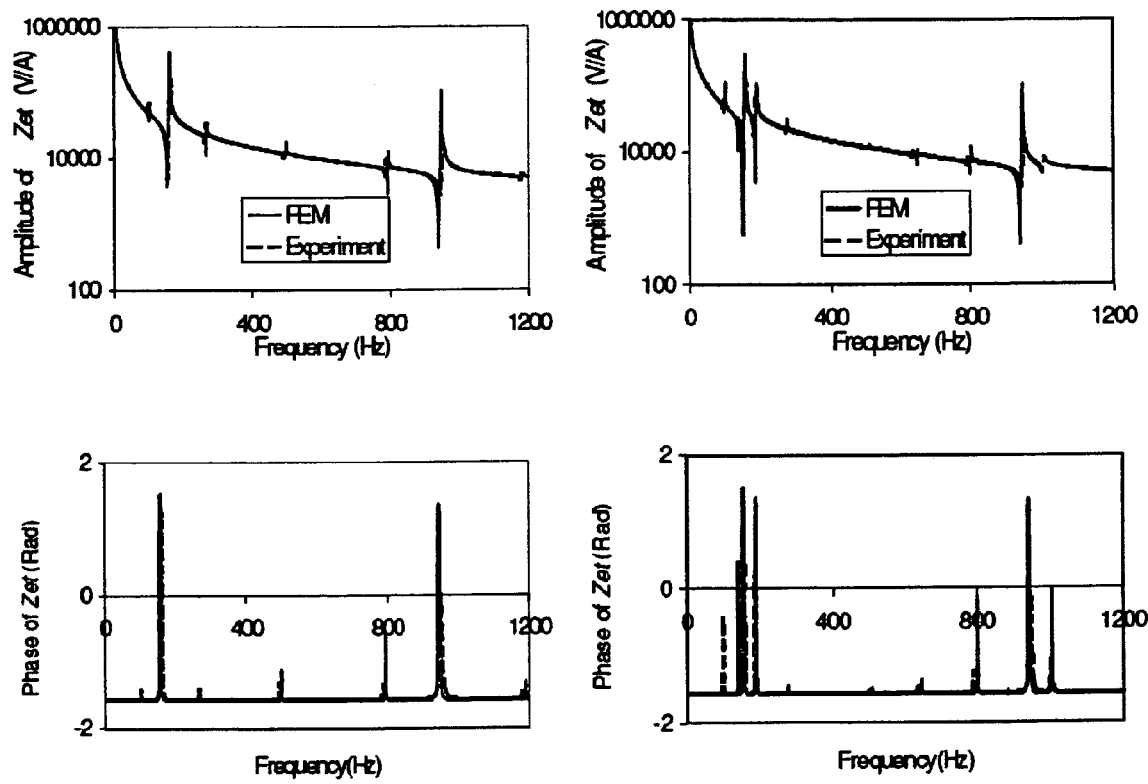
FIG. 6 shows four graphs of the input electrical impedance of the tested beam of FIG. 5.

The input electrical impedance of the transducer 20 was detected and is shown in FIG. 6. Substituting the electrical impedance into Equation (9) gives the translational mechanical impedances at the chosen two points $P_1$, $P_2$ on the beam 50. Coincidence between the experimentally and the two numerically detected impedances provided confirmation.

Figure 7:
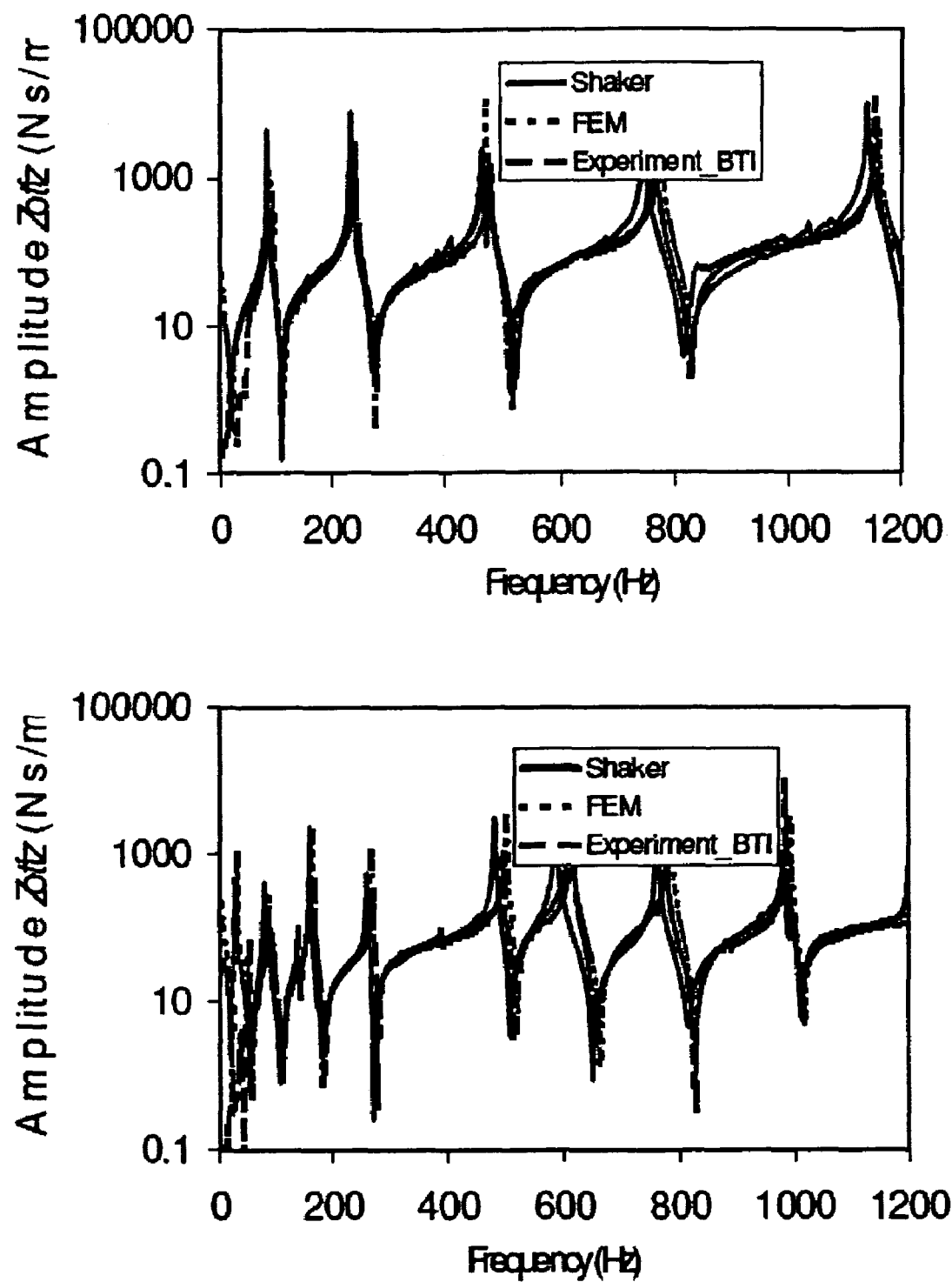
FIG. 7 shows two graphs of translational mechanical impedance of the tested structure of FIG. 5.

To further validate the conclusion, the same impedance was obtained by a conventional testing method (FIG. 7) using a min-shaker and an impedance head which contains a force sensor and a motion sensor aligned along the measuring direction. The results match well.

The method and the transducer 20 may also be used to measure point translational impedance on a plate. The aluminum plate is freely suspended, having a dimension of 1000 mm×480 mm×10 mm. Two points are chosen as the measurement points: the center Point A (0, 0, 0) and an arbitrarily selected Point B (−200, −150, 0). The results of the numerical experiments are then compared with the impedance directly calculated from a finite element model of the same plate. As shown in FIG. 9, the results again match which confirms the functions of the transducer 20 in measuring point translational impedance.

The transducer 20 may be used to measure rotational impedance. To consider the beam 50 and transducer 20 of FIG. 5, two degrees of freedom are sufficient to describe the motion at any point: one translational and one rotational. Cross mobility exists between the two degrees of freedom for all points of the beam 50 except at the middle point $P_1$. As such, a force excitation will give rise to a linear velocity, and a moment excitation will give rise to a pure rotational velocity, at the middle point $P_1$. At the point $P_2$ 200 mm from the left end, however, a force excitation gives rise to both a linear velocity and a rotational velocity due to non-zero cross mobility. Similarly, a moment generates both rotational and linear velocity. At such points, conventional methods suffer significant errors.

Figure 8:
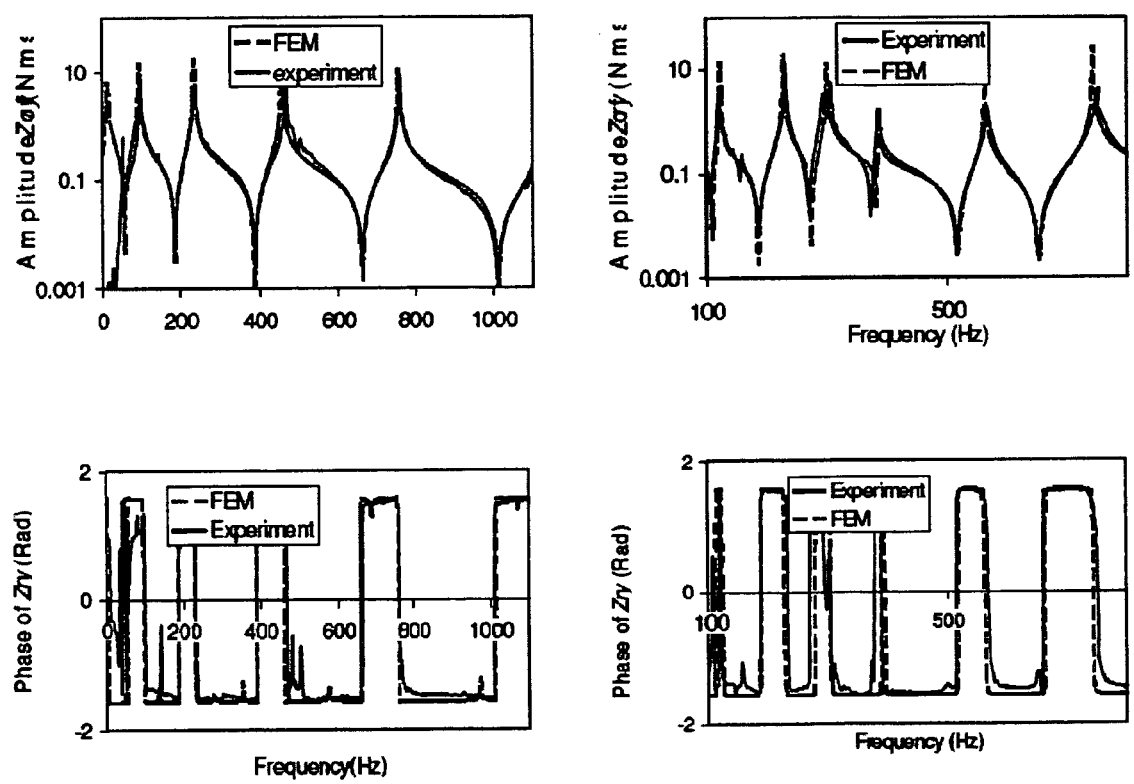
FIG. 8 shows four graphs of rotational mechanical impedance for the beam of FIG. 5.

For both points $P_1$, $P_2$ on the beam 50, the rotational impedances may be obtained numerically and experimentally by detecting electrical impedance $Z_e^r$. The procedure is similar to that of the translational case described above except that the electrical signals supplied to the left and right bimorphs 21 have opposite phase. Comparison of the numerical and experimental results is shown in FIG. 8. This leads to the conclusion that the transducer 20 accurately measures the rotational impedance at both points, irrespective of the cross mobility.

Figure 9:
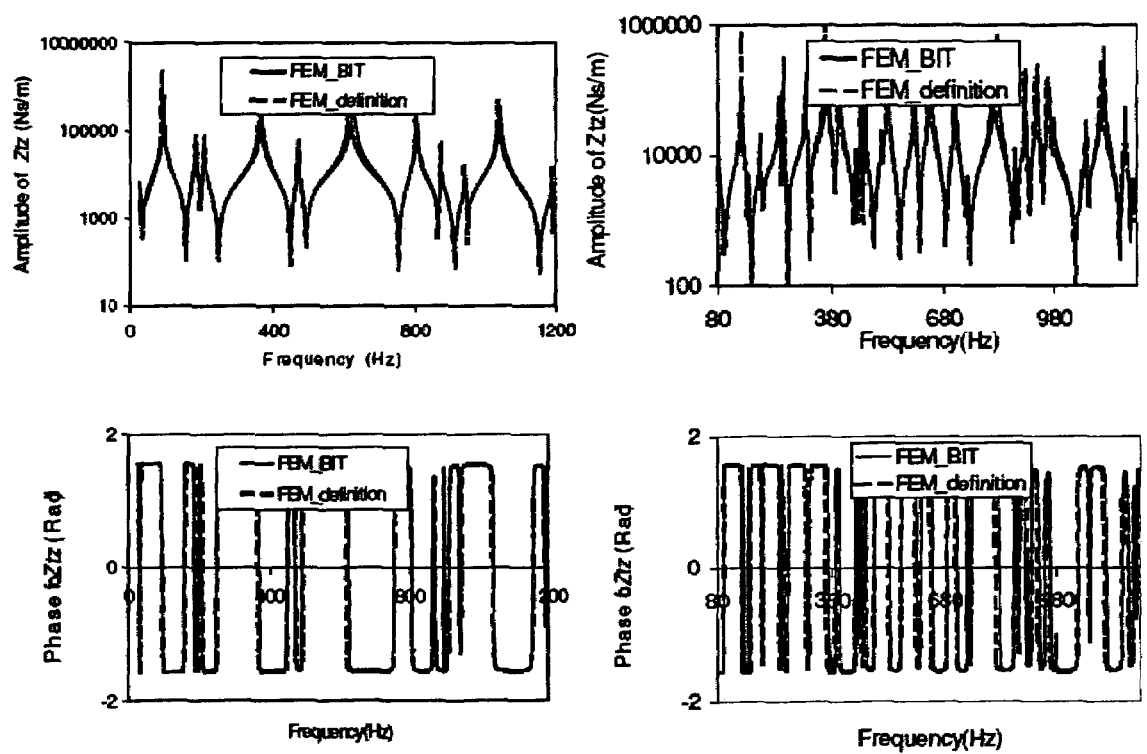
FIG. 9 shows four graphs of the translational mechanical impedance of a plate tested using the apparatus of FIG. 2.
Figure 10:
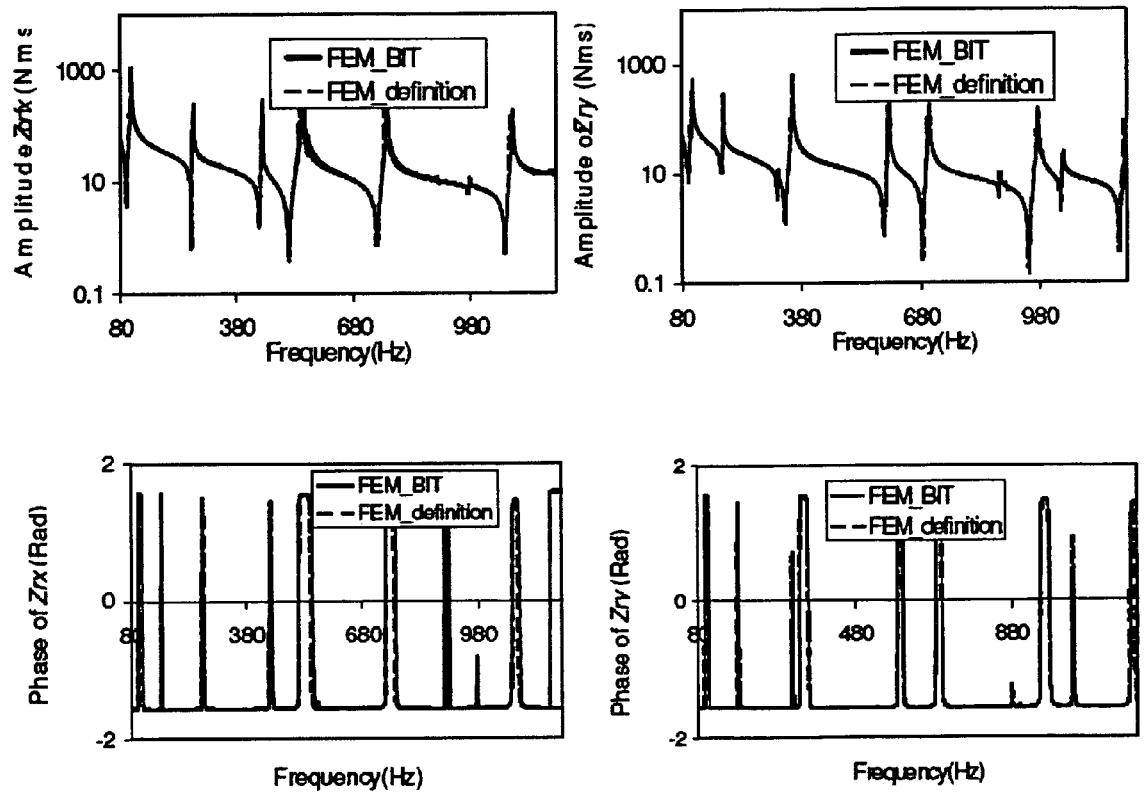
FIG. 10 shows four graphs of rotational impedance about x and y axes of a first point of the plate.
Figure 11:
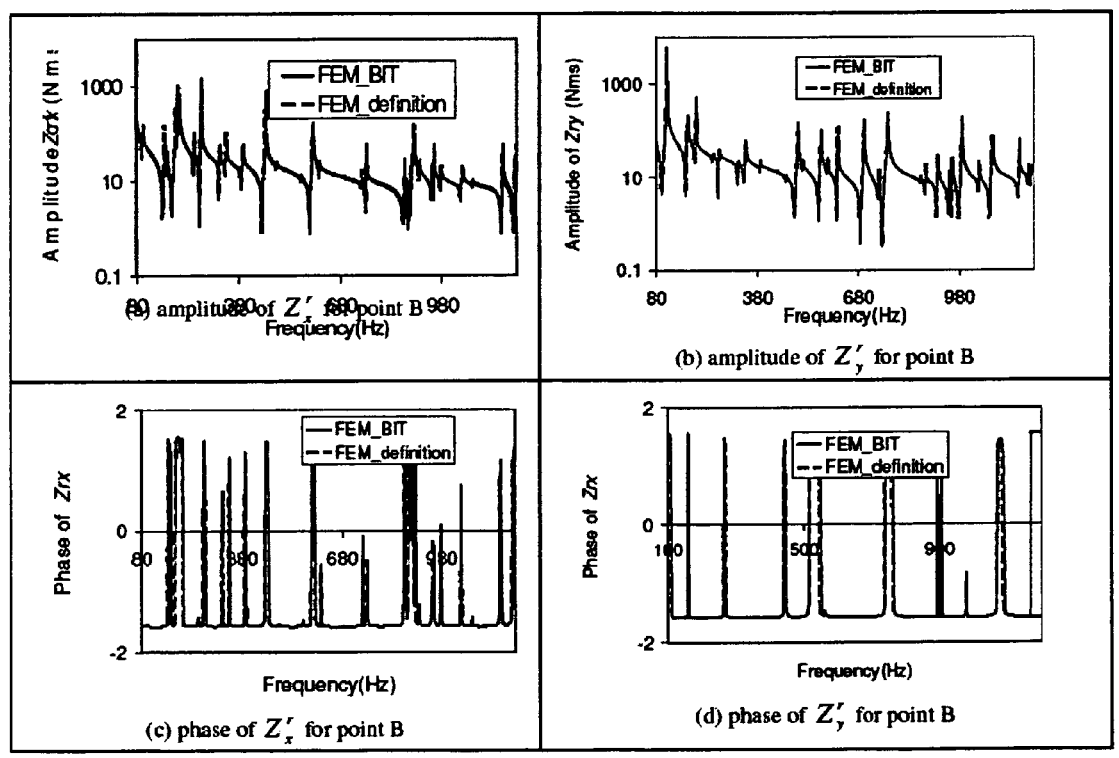
FIG. 11 shows four graphs of rotational impedance about x and y axes of a second point of the plate.

To again consider the plate example of FIG. 9, at any point of the plate, two rotational degrees of freedom exist: rotation about the x axis and rotation about the y axis. Rotational impedance of this points may be obtained by numerical simulations: one directly from the definition shown in Equation (6), and the other through the method and transducer 20 according to Equation (10). As illustrated in FIGS. 10 and 11, agreement is found in both amplitude and phase curves. Therefore, the method and transducer 20 are capable of accurately measuring rotational impedance of structures irrespective of mobility.

The method and transducer 20 may also be used to characterize the dynamic properties of visco-elastic materials such as for example, biological studies and visco-elastic machine elements. Visco-elastic machine elements may include widely-used vibration isolators.

Figure 12:
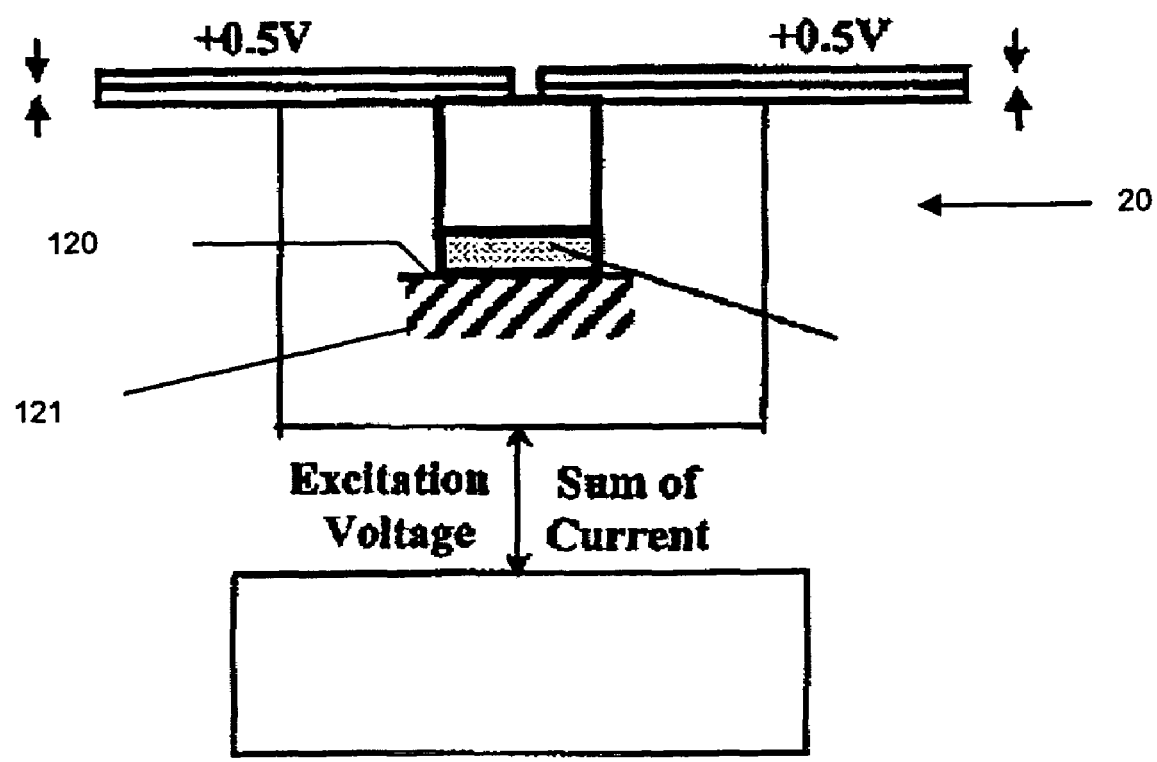
FIG. 12 is an illustration of the embodiment of FIG. 2 being used to test an elastomer.

In FIG. 12, a bimorph transducer 20 is mounted on the top surface 120 of a visco-elastomer specimen 121 which is adhered to a heavy fixture to achieve a clamped condition. Applying the same voltage to the transducer 20, the linear impedance of the specimen 121 can be identified using the same principles given earlier. Since the mechanical impedance is a linear function of Young's modulus and damping:

$$E_0 = -\frac{\omega h}{S} \cdot \text{Im}(Z_z^t) \quad (11)$$

$$\eta = -\frac{\text{Re}(Z_z^t)}{\text{Im}(Z_z^t)} \quad (12)$$

where $\text{Im}(Z_z^t)$ and $\text{Re}(Z_z^t)$ are the imaginary and real parts of the complex translational impedance of the test elastomer 121, $\omega$ is the excitation frequency, h is the height of the specimen 121, and S is the contact area between the specimen 121 and the transducer 20.

Figure 13:
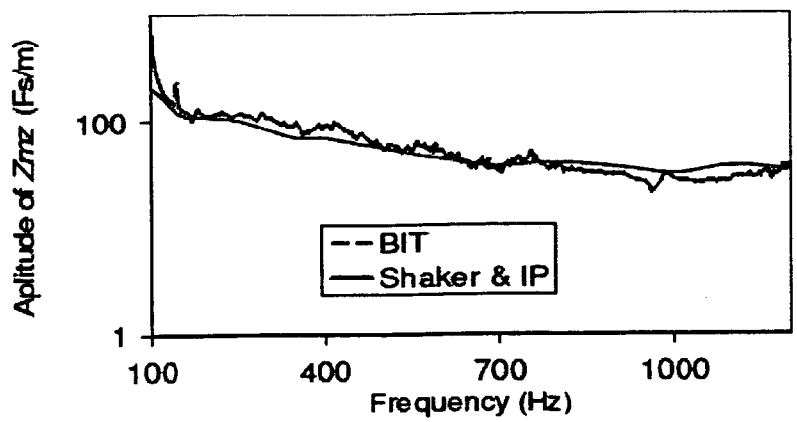
FIG. 13 is three graphs of the results of the text of FIG. 12 showing (a) translational impedance, (b) young's modulus, and (c) loss factor.
Figure 13:
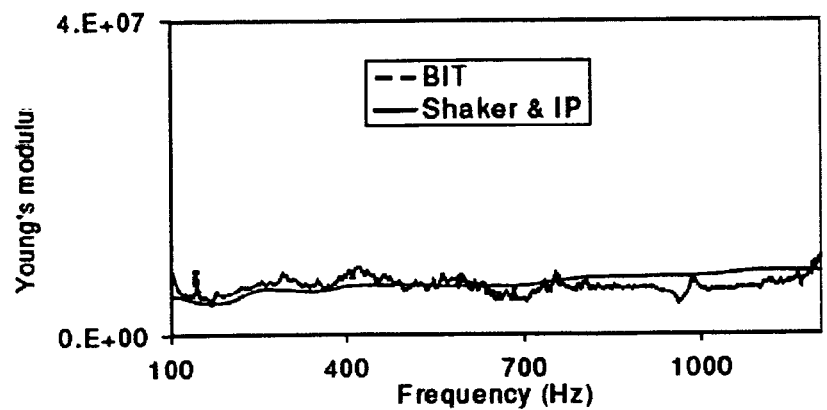
Figure 13:
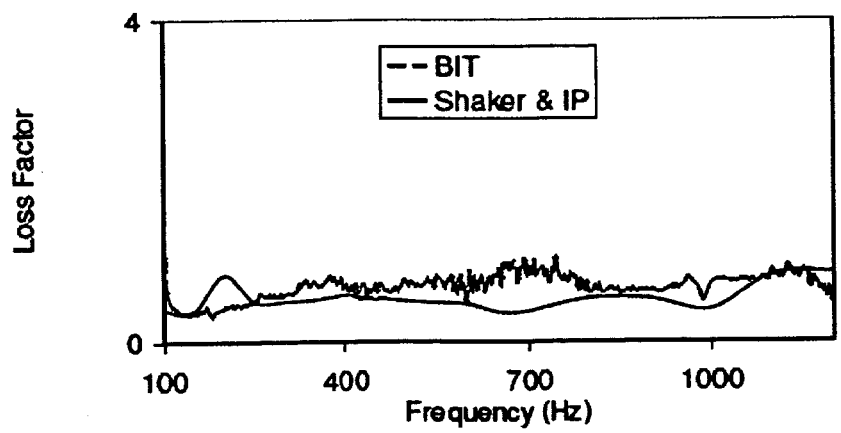

Verification experiments were performed using a conventional shaker and impedance head. FIG. 13 shows the translational impedance, Young's modulus, and loss factor of a viscoelastomer specimen 121 determined by both experiments. The results are comparable and the trends of the curves are similar.

A problem with measurement of structural rotation is the lack of a proper moment exciter. The transducer 20 may be capable of generating pure moment when supplied with electricity of opposite phase, as indicated earlier. The transducer 20, when supplied with electricity of the same phase to the two bimorphs 21, functions as a force exciter.

At the same time of actuation, by measuring the input electrical variables (voltage and current), the moment applied to the test structure may be obtained from Equation (13):

$$M_y = \frac{b_{22}E^r - b_{12}i^r}{b_{11}b_{22} - b_{12}b_{21}} \quad (13)$$

As such, the transducer 20 may be utilized as a moment sensor while exciting a structure or material specimen.

Similarly, for the translational case, also measuring the input electrical variables, allows evaluation of the excitation force as shown in Equation (14):

$$F_z = \frac{a_{22}E^t - a_{12}i^t}{a_{11}a_{22} - a_{12}a_{21}} \quad (14)$$

Figure 14:
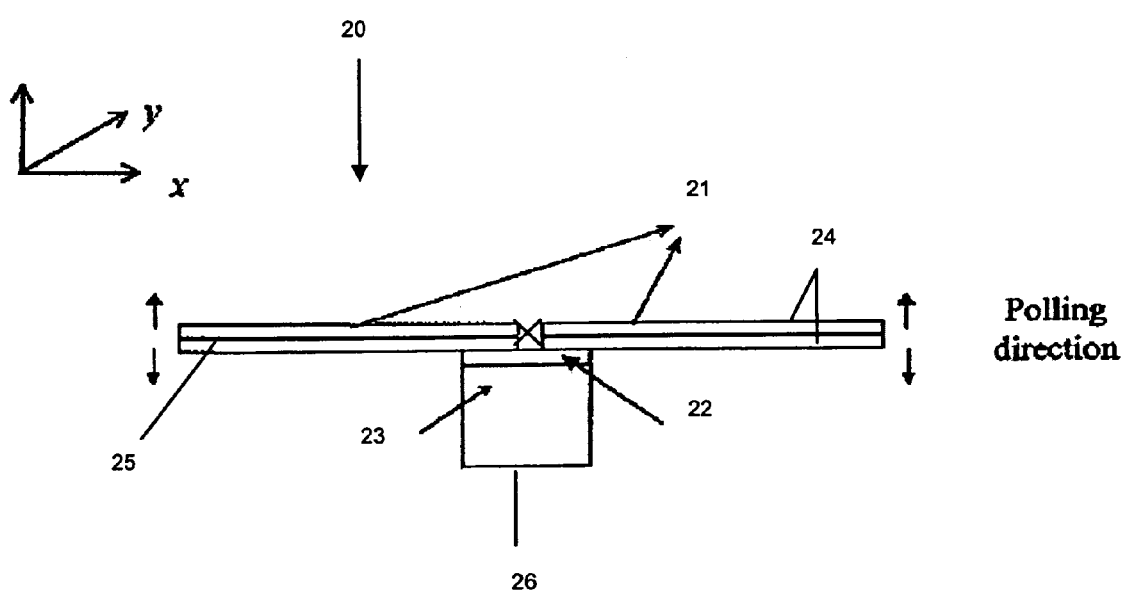
FIG. 14 shows the embodiment of FIG. 2 as a rotational velocity sensor.

The transducer 20 may also be utilized as a motion sensor to detect rotational velocity or translational velocity depending on the electrical connection of the two bimorphs 21 in the transducer 20. As shown in FIG. 14, when the upper of the electrodes 24 of one bimorph 21 is electrically connected with the lower of the electrodes 24 of the other bimorph 21, the transducer 20 functions as a rotational velocity sensor when the electrical input voltage or current is detected:

$$\omega_y = \frac{E^r}{b_{12}}\bigg|_{open-cuicuit} \text{ or } \omega_y = \frac{i^r}{b_{22}}\bigg|_{short-cuicuit} \quad (15)$$

Figure 15:
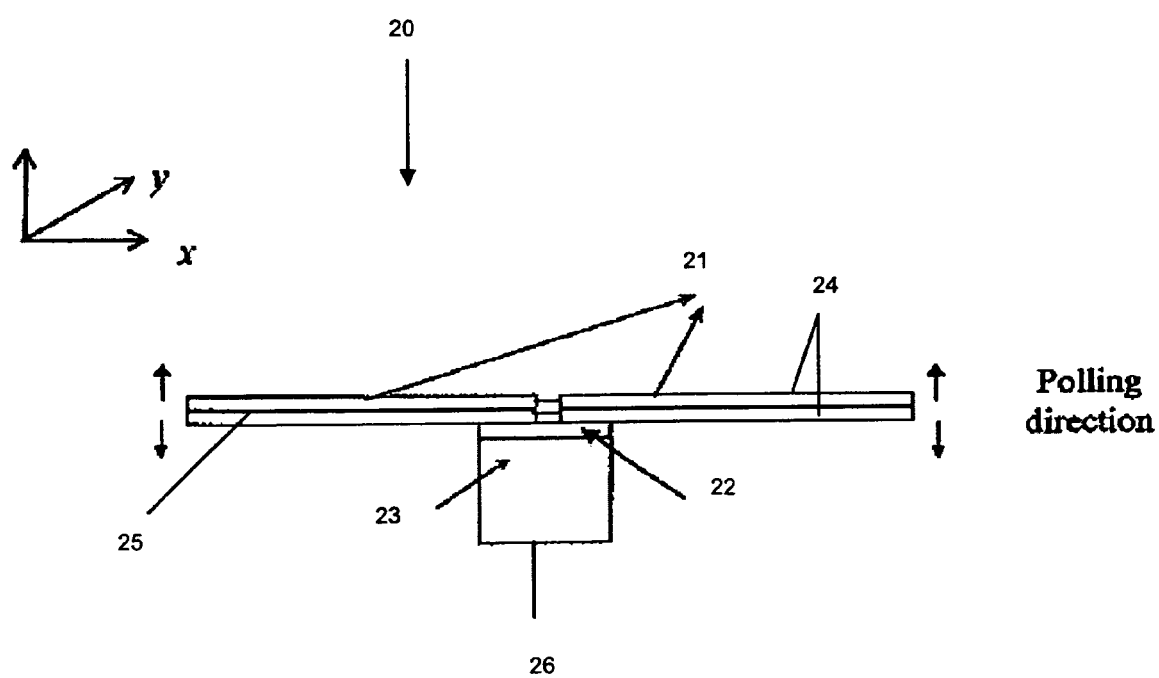
FIG. 15 shows the embodiment of FIG. 2 as a linear velocity sensor.

Similarly, and as shown in FIG. 15, when the upper of the electrodes 24 of the bimorphs 21 are electrically connected and the lower of the electrodes 24 are connected, the transducer 20 functions as a linear velocity sensor:

$$v_z = \frac{E^t}{a_{12}}\bigg|_{open-cuicuit} \text{ or } v_z = \frac{i^t}{a_{22}}\bigg|_{short-cuicuit} \quad (16)$$

When using the transducer 20 to measure the translational/rotational impedance, the measurement system consists of (1) the transducer 20 for both actuating and sensing, and (2) an electrical impedance analyzer which measures the electrical parameters supplied to the transducer. Loading effects of the transducer are decoupled by four pole model. Also, point measurement is possible as the transducer is connected to the structure through a supporting block with small contact area. The working frequency range can be up to a few thousand Hertz, or even higher.

Firstly, when attached to a surface point of a structure or material specimen, the transducer receives two sets of ac power, in phase or out of phase and generates a force or a moment that is applied to the object under test. Secondly, while the actuating is being carried out, the voltage and current probed at the transducer's input port are processed to quantitatively sense at the output port the applied force or moment, the excited translational or rotational motion, the point translational or rotational impedance of test structure, or the complex modulus of a test material specimen. Thirdly, the transducer is sensitive to only one translational or one rotational degree of freedom (DOF) in a single testing. As a result, the method and transducer reduces the cross mobility problem which has been encountered in conventional measuring rotational impedance. Fourthly, according to the size and weight of the structure or specimen under testing, transducers of different size can be properly dimensioned for dynamic measurements done to macro, miniature, meso, or even micro test objects in a desired frequency range.

The bimorphs actuators include pairs of other piezoelectric-based electromechanical actuators such as, for example, stake actuators that contain a stake of piezoceramic disks of the same diameter, and general piezo-ceramic thin-film coated on thin structures.

The bimorph actuators may also be substituted by two substantially identical equally-spaced force exciters of any suitable form such as, for example, electro-magnetic shakers, and electro-magnetic shaker, or any other actuators that operate based on the energy conversion between electro and mechanical domains taking place in properly arranged materials such as magneto-restrictive materials, piezoelectric materials, or shape-memory alloys.

Whilst there has been described in the foregoing description preferred embodiments of the present invention, it will be understood by those skilled in the technology concerned that many variations or modifications in details of design or construction may be made without departing from the present invention.

What is claimed is:

1. A transducer for dynamic testing of a specimen, the transducer comprising:
   (a) at least two equally-spaced actuators;
   (b) a supporting block for supporting the at least two equally-spaced actuators and for mounting the transducer to the specimen;
   (c) each of the at least two equally-spaced actuators being an electrically powerable actuator for providing to the specimen one selected from the group consisting of: a force, and a moment.

2. A transducer as claimed in claim 1, wherein the at least two equally-spaced actuators are identical and are selected from the group consisting of:
   a bimorph, a piezoelectric-based electromechanical actuator, a stake actuator containing a stake of piezoceramic disks of the same diameter, a force exciter, an electromechanical force exciter, and an electromagnetic shaker.

3. A transducer as claimed in claim 1, wherein electricity for supply to the at least two equally-spaced actuators is of the same amplitude to each of the at least two equally-spaced actuators.

4. A transducer as claimed in claim 1, wherein the at least two equally-spaced actuators are able to produce a force on the specimen when an electricity for supply to the at least two equally-spaced bimorphs is in phase, and a moment on the specimen when the electricity for supply to the at least two equally-spaced actuators is out of phase.

5. A transducer as claimed in claim 2, wherein when the at least two equally-spaced actuators are bimorphs, the transducer is able to operate as at least one selected from the group consisting of: an actuator, a sensor and simultaneously as an actuator and a sensor; and when as a sensor is for translational and rotational dynamic measurement.

6. A transducer for dynamic testing of a specimen, the transducer comprising:
   (a) at least two equally-spaced bimorphs;
   (b) a supporting block for supporting the at least two equally-spaced bimorphs and for mounting the transducer to the specimen;
   (c) the transducer being able to operate as a sensor for measurement of at least one selected from the group consisting of: an excitation force exerted on the specimen, an excitation moment exerted on the specimen, a resultant translational velocity of the specimen at an excitation point, and a rotational velocity of the specimen at the excitation point.

7. A transducer as claimed in claim 6, wherein the transducer is able to operate as at least one selected from the group consisting of:
   an actuator, a sensor, and simultaneously as an actuator and a sensor and when operating as a sensor is for translational and rotational dynamic measurement; the at least two equally-spaced bimorphs being able to produce a force on the specimen when an electricity for supply to the at least two equally-spaced bimorphs is in phase, and a moment on the specimen when the electricity for supply to the at least two equally-spaced bimorphs is out of phase.

8. A transducer for dynamic testing of a specimen, the transducer comprising:
   (a) at least two equally-spaced bimorphs;
   (b) a supporting block for supporting the at least two equally-spaced bimorphs and for mounting the transducer to the specimen; and
   (c) the transducer being able to operate as at least one selected from the group consisting of: an actuator, a sensor, and simultaneously as an actuator and a sensor.

9. A transducer as claimed in claim 8, wherein the sensor is for measurement of translational and rotational mechanical impedance of the specimen where the transducer is mounted to the specimen.

10. A transducer as claimed in claim 8, wherein the at least two equally-spaced bimorphs are able to produce a force on the specimen when an electrical supply to the at least two equally-spaced bimorphs is in phase, and a moment on the specimen when the electrical supply is out of phase.

11. A transducer as claimed in claim 10, wherein the at least two equally-spaced bimorphs are substantially identical; the at least two equally-spaced bimorphs being in an array in a plane perpendicular to a central, longitudinal axis of the supporting block; the array having the central, longitudinal axis as its centre; each of the at least two equally-spaced bimorphs having an inner end that is spaced from the central, longitudinal axis and also spaced from the inner end of each other bimorph.

12. A transducer as claimed in claim 10, wherein each of the at least two equally-spaced bimorphs is a piezoelectric bimorph, and each bimorph comprises an upper piezoelectric element, a lower piezoelectric element, and a reinforcing shim between the upper and lower piezoelectric elements.

13. A transducer as claimed in claim 10, wherein the supporting block comprises an insulator on which the at least two equally-spaced bimorphs are mounted, the insulator being an electrical insulator and solid, the at least two equally-spaced bimorphs being securely and rigidly attached to the supporting block.

14. A transducer as claimed in claim 12, wherein the at least two equally-spaced bimorphs are arranged in diagonally opposite pairs of two bimorphs, the upper piezoelectric element of a first of the two bimorphs being electrically connected to the lower piezoelectric element of a second of the two bimorphs for sensing rotary velocity.

15. A transducer as claimed in claim 12, wherein the upper piezoelectric element of the first of the two bimorphs is electrically connected to the upper piezoelectric element of the second of the two bimorphs; and the lower piezoelectric element of the first of the two bimorphs is electrically connected to the lower piezoelectric element of the second of the two bimorphs; the sensor being for sensing linear velocity.

16. A transducer as claimed in claim 5, wherein the transducer is for operating as a sensor for measurement of at least one selected from the group consisting of:
an excitation force exerted on the specimen, an excitation moment exerted on the specimen, a resultant translational velocity of the specimen at an excitation point, and a rotational velocity of the specimen at the excitation point.

17. A transducer as claimed in claim 11, wherein the array comprises a plurality of diagonally-opposite pairs of bimorphs.

18. A method for dynamic testing of specimen, the method comprising:
electrically powering at least two equally-spaced actuators of a transducer to cause motion of the at least two equally-spaced actuators, the at least two equally-spaced actuators being mounted on a supporting block, the supporting block being mounted to the specimen; and providing to the supporting block one selected from the group consisting of: a force, and a moment from the at least two equally-spaced actuators.

19. A method for dynamic testing of a specimen, the method comprising:
electrically powering at least two equally-spaced bimorphs of a transducer to cause motion of the at least two equally-spaced bimorphs, the at least two equally-spaced bimorphs being mounted on a supporting block, the supporting block being mounted to the specimen; the transducer operating as a sensor for measuring at least one selected from the group consisting of: an excitation force exerted on the specimen, an excitation moment exerts on the specimen, a resultant translational velocity of the specimen at an excitation point, and a rotational velocity of the specimen at the excitation point.

20. A method for dynamic testing of a specimen, the method comprising:
electrically powering at least two equally-spaced bimorphs of a transducer to cause motion of the at least two equally-spaced bimorphs, the at least two equally-spaced bimorphs being mounted on a supporting block, the supporting block being mounted to the specimen; the transducer operating as at least one selected from the group consisting of: an actuator, a sensor, and simultaneously as an actuator and a sensor.

* * * * *